United States Patent [19]

Siegel

[11] 3,764,063
[45] Oct. 9, 1973

[54] COMPUTER AND DISPLAY DEVICE
[76] Inventor: Martin Siegel, 26 Cambridge Rd., Bloomfield, N.J. 07003
[22] Filed: Apr. 18, 1972
[21] Appl. No.: 245,229

[52] U.S. Cl. ............................................ 235/61 E
[51] Int. Cl. .............................................. G06c 1/00
[58] Field of Search ........................ 35/24 R, 24 C; 235/61 A, 61 B, 61 E, 61 GM, 61 PS, 61 T; 177/216, 224, 246

[56] References Cited
UNITED STATES PATENTS

| | | |
|---|---|---|
| 784,145 | 3/1905 | Donecker .................. 235/24 C X |
| 1,204,089 | 11/1916 | Tuckey ....................... 35/24 C |
| 1,415,278 | 5/1922 | Tod ............................ 35/24 C |
| 2,036,439 | 4/1936 | Schuster ..................... 35/24 C |
| 2,066,809 | 1/1937 | Trent .......................... 35/24 C |
| 2,393,162 | 1/1946 | Hayes ......................... 235/61 E |
| 2,877,950 | 3/1959 | Olsen ......................... 235/61 A |
| 3,000,114 | 9/1961 | Orlov .......................... 35/30 |

Primary Examiner—Richard B. Wilkinson
Assistant Examiner—John E. Gonzales
Attorney—Granville M. Brumbaugh et al.

[57] ABSTRACT

A device for visually and mechanically representing variable information about a group of items and for computing from such information and visually displaying an aggregate result for all items of the group comprises a panel member and a balance arm mounted on the panel member for rotation about an axis. A multiplicity of display components, each of which has a physical weight indicative of a first element of variable information about one of said group of items, is supported on the balance arm. The position of each of the display components on the balance arm is indicative of a second element of variable information about the component. The orientation of the balance arm indicates an aggregate result that is a weighted average for all of the items of a function of the product of the first element of information multiplied by the second element of information for each item of the group.

5 Claims, 3 Drawing Figures

Patented Oct. 9, 1973 3,764,063

COMPUTER AND DISPLAY DEVICE

BACKGROUND OF THE INVENTION

This invention relates to a device for computing and displaying an aggregate result derived from two or more elements of information about each item of a group of two or more items.

It is frequently helpful, particularly in various types of forecasting and planning, to compute an aggregate or weighted average result for several items making up a group based on two or more elements of information for each item of the group that are multiplied together to obtain an individual result for each item. For example, a marketing analysis may involve establishing a trend factor for each of several items of a product line and determining the sales volume, profit, or some other indicator of a present monetary commitment to each of the products. If the trend factor is multiplied times the monetary commitment and those values are then summed and divided by the total monetary commitment, the result will be an overall trend factor for the product line. This analysis may be useful in suggesting revision of the product commitments in order to improve the overall prospects for the product line.

A similar analysis of a portfolio of securities, for example, common stocks, can be very useful in providing to the owner of the portfolio an indication of the overall or aggregate trend of the portfolio. The individual securities in any portfolio usually differ from each other as to the potential for a price rise or price decline. Moreover, the monetary commitment of the owner to each of the securities of the portfolio will usually vary from item to item. The overall potential of the portfolio is dependent upon both of these variables for each security in the portfolio. For example, a small holding of a security having a high downside market price potential is far less important than a large holding of a security having a high upside price potential. On the other hand, a small holding of a security having a high downside price potential may be merely offset by a large holding of a security having a low upside potential.

It is, of course, possible to make various calculations to obtain an overall or aggregate evaluation in numerical terms of a portfolio. Similarly, other business information involving variable information elements about each of several items can be worked out by hand mathematically. Mathematical calculations of this type, however, are tedious and time-consuming, are subject to error, and frequently do not highlight particularly significant facts, inasmuch as the large number of individual steps in the calculations tends to obscure or dull the significant facts. In many instances, the variable information to be analyzed, for example, security market price, changes on a day-to-day basis, which means that new sets of calculations must be made frequently, thereby multiplying the difficult and time involved. Similarly, an analysis may involve testing of various hypothetical fact situations; for example, one may be considering the effect of an overall portfolio based on selected sales or purchases of various securities under consideration. For the above and other reasons, manual calculations are of limited practical utility.

SUMMARY OF THE INVENTION

There is provided, in accordance with the present invention, a device for visually and mechanically representing variable information about each item of a group of items and for computing from such information and visually displaying an aggregate result for all of the items of the group. The device comprises a panel member and a balance arm mounted on the panel member for rotation about an axis. A multiplicity of display components, each of which represents an item of a group, has a physical weight indicative of a first element of variable information about the item and is supported on the balance arm at a position located along the balance arm that is indicative of a second element of variable information about the item. With the selected group of components of appropriate weights located in appropriate positions on the balance arm, the balance arm assumes an equilibrium position or orientation by pivoting about its pivotal axis. The equilibrium orientation is indicative of a weighted average or aggregate result for all of the items of the group of a function of the product of the elements of information about each item.

Preferably, the device includes indicia on the panel member of a range of possible aggregate results and a pointer or other elements associated with the balance arm for indicating on the indicia the aggregate result for the group of items being analyzed. For example, the indicia of a range of possible aggregate results may be arranged in an arc concentric with the axis of rotation of the balance arm, and a pointer provided in association with the balance arm for designating the specific indicia on the panel.

The form of display components may vary considerably. For example, the display components may be lightweight discs marked to identify the item. The weight factor for each of the display components may be a set of weights in the form of pins that are stuck into the display component, or they may be discs or other forms of weights that are suspended from or otherwise attached to a base portion of a display component or attached to the balance arm. Though it is not necessary, it is advantageous to provide a way of varying the physical weight of the display components relatively conveniently, inasmuch as one principal purpose of the device is to facilitate the calculation and display of variable information, the weights of the components being indicative of one element of such variable information.

An application of the invention to a specific field of use, a security portfolio analyzer, involves the visual and mechanical representation of (1) a price potential factor and (2) the extent of monetary commitment for each of a group of securities. The weight of each of a set of display components that represent the securities in an actual or hypothetical portfolio is indicative of the monetary commitment of the portfolio owner in each security. Each display component is preferably marked with an indicia, such as the standard market letter designation for the security, to identify it. By whatever means the portfolio analyzer may choose, the user analyzes each individual security item on the basis of the degree of potential for upside or downside price movement over any planning period (short term or long term) desired. Each security in the portfolio is assigned a value on an appropriate scale in either the upside or downside direction indicative of the degree of potential future price movement. For example, the scale may be established on the basis of the hours on a clock, the hours from 12 to 6 representing degrees of downside potential, with the greatest risk for downward movement being at 12 and the risk lessening moving toward 6. Thus the hours of 5 to 6 represent limited downside risk and indicate a bottoming out of the particular security. The hours 6 and 7 may represent the beginnings of an upturn and thus will be indicative of a major upside price change potential. The hours from 8 to 12 may represent decreasing degrees of upside price change potential as the price nears a projected top. In other words, as the hour hand of a clock may be viewed in moving from 12 to 12, 12 represents a projected top price for a particular security and a suggestion that the security has a major downside potential; as the clock hands move toward 6, the security price is falling, which indicate that its potential for a further significant price drop is diminishing as the hour hand approaches 6. Six represents the predicted price bottom for the security in a cycle and suggests a high upside price change potential. As the clock hand moves from 6 back up to 12, the stock is rising and the potential for further gain diminishes.

As a further desirable, though unnecessary, feature of the invention, the panel that carries the balance arm may bear indicia of a range of trends or risk factors on the downside and upside. For example, a circular indicia marked from 1 to 12 like the hour marks of a clock may be provided on the panel. Individual display components marked for identification may be positioned radially outside of the indicator circle at their assigned potential positions around the indicator and thus provide a visual display of the individual items of the portfolio separate from the balance arm computer. As the potential of each security changes, the display component representative of it may be moved around the clock to its new position.

In a security portfolio analyzer, the weighted display components are positioned either to the right or to the left of the fulcrum, depending on whether there is an upside or downside price change potential, and the distance of each display component from the fulcrum represents the degree of upside or downside potential. On the clock form of scale for projected price movements, for example, the balance arm may be marked off in increments with 6 at the extreme left of the balance arm and 12 at the extreme right. The left side of the balance arm represents the zone of upside potential price movement and is marked off from left to right in increments in the order 6, 7, 8, 9, 10 and 11. The right side of the balance arm may represent the zone of downside potential and is marked off in increments in the order 5, 4, 3, 2, 1, 12, moving from left to right.

In the use of the device, as exemplified by the portfolio analyzer described above, each display component, which represents a security item in an actual or hypothetical portfolio, is given a weight value that is indicative of the monetary commitment in the security involved, and each component is positioned on the balance arm in a location along the scale that is indicative of the separately analyzed potential for price movement over any selected term for which the user may desire to apply the analysis. The balance arm rotates to an equilibrium position and in the process makes calculations of a weighted average or aggregate result indicative of the degree of potential for appreciation or depreciation in the value of the portfolio as a whole. The user may readily and at will adjust the weights, change the positions and add or remove display components from time to time to account for changes in the portfolio or to introduce into the analysis hypothetical changes in the portfolio, and he will immediately receive a new result that will be of some guidance in making investment decisions.

It is evident that the scale factors, that is, the relationships between distances on the balance and the weights of the components and the balance arm itself, should be designed so that the balance neither over-responds nor under-responds and thus gives exaggerated results. The calibration of the device to provide accurate indications of overall trends based on individual elements of variable information is a matter of engineering the particular system with respect to the physical moments (weights times distances) of the increments along the balance arm and the weights of the display components. Accordingly, elaboration on this point is not required.

Among the advantages of the invention are its ability to provide rapid and effective computation of an aggregate result from numerous items of variable information in a minimum of time, usually in much less time than would be required for numerical calculations. As a display of information, such as the status of a security portfolio, the device is highly useful in that it permits the user to see at a glance elements of variable information about a group of items. By the use of colors, shapes and other elements of aesthetic design to identify items with common or related characteristics, the device may be made very attractive as a wall display for use in offices, studies and other appropriate locations. Such colors, shapes, size variations, etc. will also be employed to impart information, such as industry-group, volatility, products and the like.

DESCRIPTION OF THE DRAWINGS

For a better understanding of the invention, reference may be made to the following description of an exemplary embodiment, taken in conjunction with the figures of the accompanying drawings, in which.

DESCRIPTION OF AN EXEMPLARY EMBODIMENT

Figure 1:
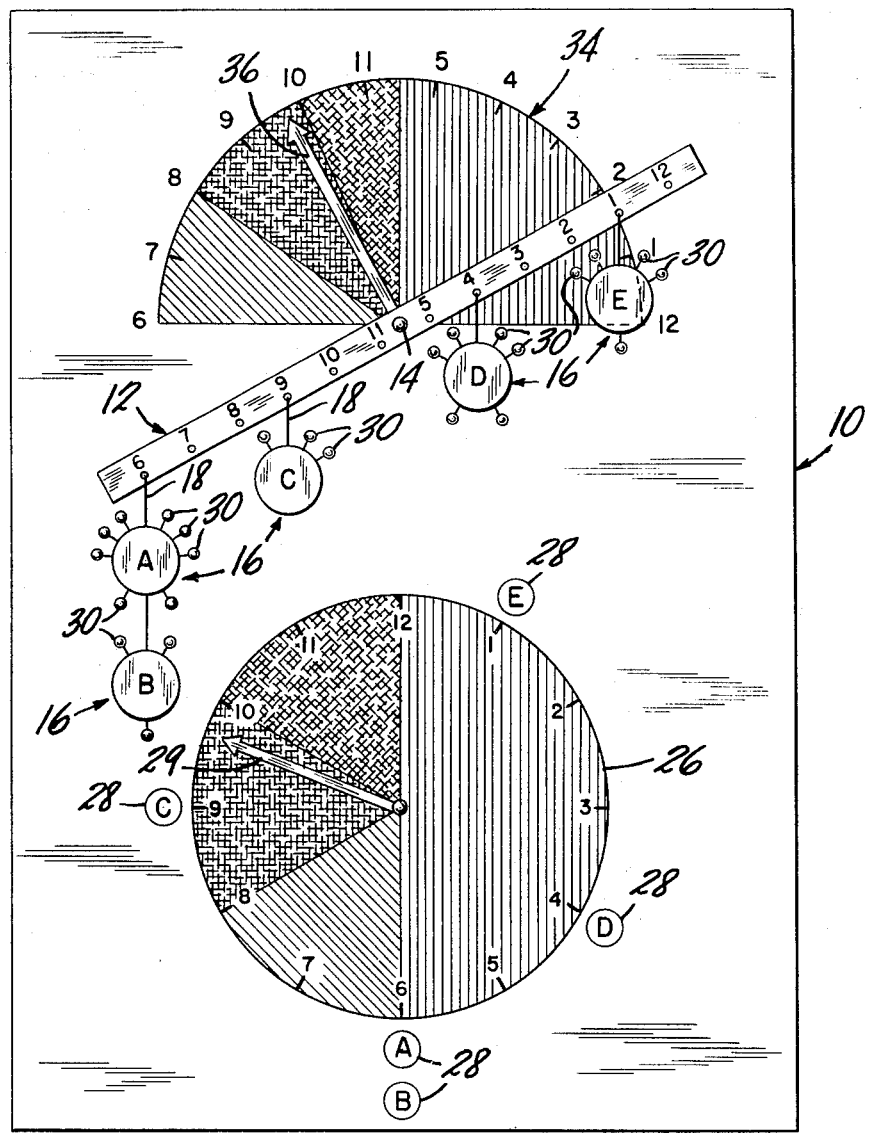
FIG. 1 is an overall elevational view of the embodiment.

The exemplary embodiment of the device shown in FIG. 1 is a security portfolio analyzer and comprises a panel member 10 of an appropriate size and shape to accommodate the other components of the device (described below). The panel member 10 may taken various forms, depending on the manner in which the device will be used. In general, the panel will be a rigid sheet of material, such as plywood, hardboard, cardboard, metal or plastic, and is constructed for mounting or hanging on a wall or in some other suitable manner being positioned vertically for display. It is advantageous to provide a form of panel that permits lettering, display components and the like to be temporarily affixed to it in various positions, such as by means of "Velcro," magnets or pressure sensitive adhesive. Thus, in the embodiment, for example, the panel 10 is a rigid sheet covered with the loop cloth component of Velcro. The size of the device (including the panel, of course) may vary widely depending upon how and where it will be used.

A balance arm 12 is mounted for rotation on the panel 10 about a pivot axis such as by means of a pivot pin 14. The balance arm is a rigid, relatively thin strip of an appropriate material, such as metal, wood or plastic, and is constructed to permit a number of indicator components 16 to be mounted at selected points along its length. The pivot mounting pin 14 is located at the center of the balance arm, so that in the absence of any objects being hung or mounted on it, it extends horizontally across the panel. The balance arm 12 is divided and marked in increments that represent a scale of variable information. In the stock portfolio analyzer the scale is divided and marked with the numbers 1 to 12 in the manner illustrated in FIG. 1.

Figure 2:
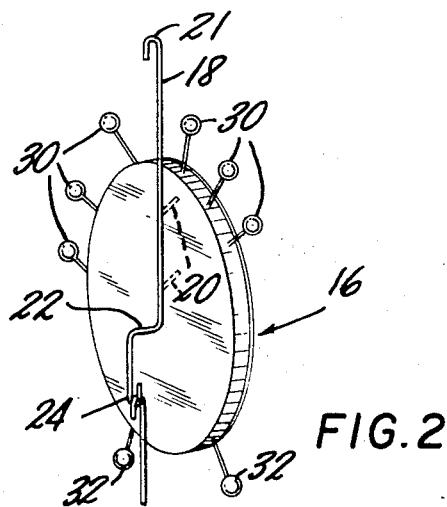
FIG. 2 is a pictorial view of an appropriate form of display component for use in the device, the view being taken from generally rearwardly of the component.
Figure 3:
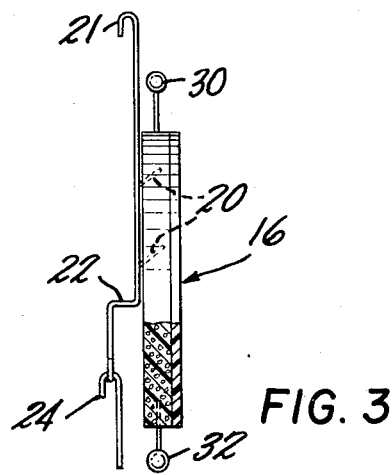
FIG. 3 is an edge view of the display component of FIG. 2.

Referring to FIGS. 2 and 3, each indicator component 16 is a disc constructed in a manner that permits its weight to be varied conveniently. In the embodiment, each disc is circular in shape and is made of a rigid, lightweight foam material, such as polystyrene. Advantageously, the visible face of each disc is covered with paper or plastic so that it may be marked or printed upon with indicia that will identify the item which it represents. In the case of a security portfolio analyzer, for example, the face of each disc may be premarked or marked by the user with pen or crayon with the standard stock market letter designation for the security item. Each indicator component shown in FIG. 1 is marked with a single letter designation for purposes of this description.

It will be apparent to those skilled in the art that various shapes of indicator elements, various materials and various systems for conveniently modifying the weight of each element can be provided. In FIGS. 2 and 3, the plastic foam discs 16 are mounted on small brackets 18, by pressing them onto pin portions 20 on the brackets. The upper end of each bracket 18 is formed with a hook 21 that is received in a selected one of a series of holes spaced along the balance arm 12 (see FIG. 1) in positions corresponding to the scale designations marked on the balance arm. The lower end of the bracket 18 has an offset portion 22 and a hook 24 that permits additional indicator components 16 to be hung (i.e., in the manner depicted by the indicator component labeled B in FIG. 1) from an indicator component that is hung directly on the balance arm 12.

In the security portfolio analyzer illustrated in FIG. 1, the lower portion of the panel bears a clocklike circular plate, sheet or printed area 26 that is marked off precisely in the manner of a clock with the hour numbers 1 to 12. As described above, the degree of the potential for a rise or fall in a security market price may be established on a scale numbered from 1 to 12, 12 representing a top expected market price, and 6 indicating a bottom expected market price. In the price cycles of any security, such as a common stock, that is, of course, undesirable to buy a stock when it is believed that the stock is at a high price and will thereafter fall. Similarly, it is advisable to buy a stock that is believed to be at its low price and is likely to move into a rising price pattern. Through various techniques of analysis (such techniques vary widely depending on the views of the analyst) any security may be placed on the 1 to 12 scale of a price cycle at any given time.

In the use of the stock analyzer form of a device according to the invention, the circular area 26 is employed visually to depict the current position in its price cycle of each security of an actual or hypothetical portfolio. For example, the user's own holdings may be displayed on the panel 10, or the 30 Dow Jones Industrials may be depicted. In FIG. 1, securities A, B, C, D and E are shown. Each security is represented by a disc 28, which may be the same as the disc elements 16 employed on the balance arm or a smaller cardboard or plastic disc. If the panel surface is the loop cloth of Velcro, then each disc 28 may have a small piece of the hook cloth element of Velcro adhered or otherwise secured to its back surface. With a magnetic form, small magnets (not shown) on the back of each disc may be employed to mount the discs on a metal panel 10.

Each disc 28 is placed in a position on the panel radially outside of the numerical scale that the analyst believes is appropriate for the particular security. For example, the disc E is positioned radially outside the numerical point 1 on the clock which is indicative of the belief of the analyst that the stock has just commenced a downturn from a high at 12 and is likely to move down for some period of time before reaching a low at 6; the disc labeled C is positioned radially outside of the number 9, which is indicative of the believe of the analyst that the security C has reached about the mid point in a rise from its low at 6 to a high at 12. As a further feature, the circular area 26 may be colored in different zones to represent positions that should be taken with respect to securities that fall into the various zones. In general, the zone 12 to 6 is an area representing a falling price pattern and is therefore an area that might be colored red (as shown) to indicate that a security positioned in that zone should not be considered for purchase, or if held, should be considered for sale. The zone from 6 to 8 might be colored green as indicative of a "buy" region, inasmuch as a security with a price pattern in the 6 to 8 zone is in the early stages of a price move from a low at 6 toward a high at 12. The zone from 8 to 10 might be colored yellow as indicative of a hold region, but not necessarily a buy region, for securities in that zone. Finally, the zone from 10 to 12 might be colored orange as indicating a zone of caution where scurities should be considered for sale. These and other arrangements of design, color and marking can, of course, be varied, depending on the particular analysis system that is thought to be desirable. A movable pointer 29 may be used to indicate the current potential of the user's total portfolio (see below) or of the 30 Dow Jones Industrials.

It is quite evident that individual stocks in an actual or hypothetical portfolio may be at various points along the individual price cycles. The stock analyzer provides a highly useful, as well as decorative, tool for determining and displaying the overall trend of the portfolio. The potential for a gain or loss in the total portfolio is a function of (1) the potential for gain or loss in the prices of the individual securities in the portfolio and (2) the magnitude of the commitment to each security in the portfolio. The stock analyzer combines at least those two variables for each stock and produces an aggregate result or weighted average in terms of the overall potential for a gain or loss for the entire portfolio.

In particular, the actual or hypothetical holding of each security in the portfolio is represented by the physical weight of each indicator component 16 hung from the balance arm 12. Inasmuch as the monetary holding for each security may vary from time to time, depending upon sale and purchase transactions as well as on changes in market price, the total commitment should be indicated by an adjustable weight. In the embodiment, the weight adjustment is provided by inserting a selected number of weights in the form of pins 30 into the plastic material of the discs 16, the weight of each pin being calibrated on a scale appropriate to the portfolio. For example, each pin may represent $1,000 or $10,000 of monetary value for the particular security. In FIG. 1, there are six pins 30 in the top portion of the indicator component lettered A, three pins in C and so forth. If each pin represents $1,000, then the indicator component labeled A represents a security A in which the analyzer has a monetary commitment of $6,000; similarly, the security C has a current market value of about $3,000. For greater precision, smaller weight units in the form of lower weight elements can represent fractional values.

It will be observed that there are several pins 32 inserted in the lower portions of the indicator elements labeled A, B, D and E. These pins are present as an optional feature of the system and represent "volatility factors" for each of the securities. It is well known that various securities differ widely from one another with respect to the magnitude of price swings in a given cycle on a percentage or other basis. Relatively speculative securities, for example, swing rather widely throughout a range varying at a rather high percentage of a median or average price. On the other hand, "blue chip" stocks tend to have relatively moderately changing price patterns. The analyzer may choose to add additional weight to those indicator components that represent securities having relatively high price volatility, and moreover, to vary the number of pins depending on the degree of volatility. In FIG. 1, the component labeled C might well be a blue chip stock having little volatility in its price movement, while B has a moderate volatility (one volatility unit) and A has a relatively high volatility (two volatility units). It should be quite apparent that an important factor in the overall prospects for a gain or loss of a particular portfolio is significantly affected by the volatility of the securities; thus the volatility weight elements used in the analyzer build the volatility factor into the computed aggregate result and enhance its accuracy.

As already mentioned, the other important variable (the first being monetary commitment) in the prospects for appreciation or depreciation in a security portfolio is the position of the current price of the security in its overall price cycle. If a security is purchased at a low price in its cycle and has a high potential for gain, an analysis of the portfolio as a whole must take into account the anticipated high potential for gain for that security. The degree of potential for a price upturn or price downturn in the individual securities of a portfolio is represented on the balance arm by the distance each indicator component is from the pivotal axis 14 of the balance arm 12. The greater the distance from the balance arm, the greater is the multiplying affect of the indicator component. Accordingly, the balance arm is marked off and labeled to a scale indicative of the degree of potential for price upturn or downturn. In FIG. 1, the scale runs, beginning at the left, from 6 to 11 on the left side of the pivot axis 14 and from 5 down to 1 and finally 12 to the right of the pivot axis. By comparing the clock form of scale on the bottom of the panel with the balance arm scale, it becomes evident immediately that the balance arm is arranged with upside potential to the left of the axis and downside potential to the right and with the maximum potentials in either direction at the extreme ends of the balance arm and with diminishing degrees of potential in either direction being marked off and indicated moving from the extreme ends toward the axis 14.

From the foregoing, it should be evident that each indicator component on the balance arm tends to pivot the balance arm out of a horizontal position into an inclined position. The degree of incline generated by each element is a function of the weight of the component and the distance that the component is from the axis. These two variables for each security, as represented by an indicator component in a given position, are individually multiplied and the products combined on a plus and minus basis to result in an equilibrium position of the balance arm that is indicative of the degree of potential for price rise or price fall of the overall portfolio. The degree of potential for rise or fall of the overall portfolio is indicated by indicia scaled on the 1 to 12 clock system and marked on a zone of the panel 10 represented generally by the reference numeral 34. The zone 34 may be colored to match the zone 26. A pointer 36 mounted on the balance arm and movable with it as it rotates between various equilibrium positions indicates on the scale the overall result, that is, the degree of potential for gain or loss in terms of the clock form of scale.

It is apparent, therefore, that the user can immediately determine the overall prospects for his portfolio basd on the securities represented by the indicator components 16 suspended from the balance arm 12 by reading from the scale indicia 34 on the panel. Moreover, the orientation of the balance arm itself is also readily evident, and it is quite apparent that an upward inclination from left to right of the balance scale indicates a favorable portfolio position, that is, a potential for appreciation and that the degree of such upward inclination indicates the degree of the potential for appreciation. Similarly, a downward inclination of the balance arm from left to right indicates an undesirable portfolio position, inasmuch as it indicates a potential for a loss in the total portfolio value, the magnitude of the downward left to right inclination being indicative of the degree of the potential for a loss.

Instead of having a pointer pointing to indicia 30 in the pattern and labeled as illustrated in FIG. 1, indicia may be marked at the outer radii of the balance arm in a semi-circular arc of which the balance arm itself is a diameter. The ends of the balance arm will then point to numerical indicia of the aggregate result of the computation.

As mentioned above, various designs and color schemes can be built into the device for aesthetic reasons and also to facilitate interpretation of the information displayed and computed by the device. For example, various zones of the balance arm may be colored to match the color scheme of the circular area 26 in the lower part of the panel. The indicator components may be shaped differently to represent other variable information, for example, long term or short term positions in the various security holdings that might very well affect purchase and sale decisions based on tax consequences. Similarly, variations in the colors, or shapes, or both of the indicator components 16 might be used to represent major and minor holdings, the fact of whether there is a gain or loss at the current market relative to the original purchase price or tax basis, the nature of the business of the issuer of the security (for example, oil, chemical, capital manufacturing, conglomerate, utility). The weight pins, washers or other variable weight elements can be colored differently or shaped differently to represent different magnitudes or functions; for example, weight elements indicating monetary commitment may be of different shapes and weights from weight elements indicating volatility factors.

Other variations and modifications of the device of the invention will be readily apparent to those skilled in the art. Thus, the above-described embodiment is intended to be merely exemplary, and the above and other variations and modifications of the invention are intended to be included within the scope of the invention as defined in the appended claims.

I claim:

1. A device for visually and mechanically representing variable information about a group of items and for computing from such information and visually displaying an aggregate result for all of the items of the group comprising a panel member, a balance arm mounted on the panel member for rotation about an axis, a multiplicity of display components, each of which has a physical weight indicative of a first element of variable information about one of said group of items, means for supporting the display components on the balance arm at positions along a substantially straight line, each of which positions of the components is indicative of a second element of variable information about a component, coacting means on the panel and the balance arm for visually indicating an aggregate result that is an average for all of the items of the product of the first element of information multiplied by the second element of information for each item, visible indicia on the panel member in a zone thereof spaced from the balance arm for indicating a range of said second elements of information about the individual items of the group, and a multiplicity of display components representing the items, said components being mounted on the panel adjacent said visible indicia, the respective components being arranged relative to the visible indicia in accordance with the applicable second element of information about the item which such component represents.

2. A device according to claim 1 and further comprising indicia on the panel member of a range of possible aggregate results, and means associated with the balance arm for indicating on the panel member indicia the actual aggregate result.

3. A device according to claim 2 wherein the panel member indicia are arranged on an arc concentric with the axis of rotation of the balance arm.

4. A device according to claim 3 wherein said indicating means includes a pointer mounted on the balance arm.

5. A device according to claim 1 wherein the display components include base members of substantially equal weight and marked with indicia that define a specific item and a multiplicity of weights selectively mountable on the base members to enable the weights thereof to be adjusted to values indicative of said first elements of variable information.

* * * * *